United States Patent [19]

Merigaud et al.

[11] Patent Number: 5,342,810
[45] Date of Patent: Aug. 30, 1994

[54] ZINC-CONTAINING, LEAD- AND CADMIUM-FREE GLASS FRITS, METHOD OF THEIR PRODUCTION AND THEIR USE

[75] Inventors: Bernard Merigaud, Saint-Léonard-de-Noblat; Michel Claus, Solignac, both of France

[73] Assignee: Degussa Aktiengesellschaft, Frankfurt, Fed. Rep. of Germany

[21] Appl. No.: 24,235

[22] Filed: Mar. 1, 1993

[30] Foreign Application Priority Data

Mar. 2, 1992 [FR] France ................ 92 02457

[51] Int. Cl.$^5$ ............................. C03C 8/14
[52] U.S. Cl. ......................... 501/26; 501/79;
  501/58; 501/63; 501/78; 501/65; 501/67;
  501/70; 501/72; 501/25; 501/24; 501/17;
  501/59; 501/64; 428/428; 428/688; 428/689;
  428/699; 428/702; 428/426
[58] Field of Search .............. 501/79, 58, 63, 78,
  501/65, 67, 70, 72, 26, 25, 24, 17, 59, 64;
  428/428, 688, 689, 699, 702, 426

[56] References Cited

U.S. PATENT DOCUMENTS

| | | | |
|---|---|---|---|
| 2,482,533 | 9/1949 | Andrews | 501/77 |
| 4,359,536 | 11/1982 | Graff et al. | 501/26 |
| 4,970,178 | 11/1990 | Klimas et al. | 501/26 |

FOREIGN PATENT DOCUMENTS

| | | |
|---|---|---|
| 0294502 | 6/1987 | European Pat. Off. . |
| 0267154 | 10/1987 | European Pat. Off. . |
| 321297 | 6/1989 | European Pat. Off. . |
| 0347379 | 6/1989 | European Pat. Off. . |
| 155040 | 12/1981 | Japan . |
| 288929 | 11/1988 | Japan ................ C03C 3/66 |
| 1682335 | 7/1989 | U.S.S.R. . |
| 768925 | 5/1955 | United Kingdom . |
| 1013597 | 11/1964 | United Kingdom . |

OTHER PUBLICATIONS

Abstract for SU 168335 and SU 1682335 itself. Oct. 1991.
Abstact for JP 60–186438, Sep. 1985.
English language abstract of SU 1,682,335 taken from World Patents Abstracts, Sovient Patents Abstracts, A-M Chemical, Week 9228, Patents 166828-1684772, Issued 26 Aug. 1992.
Patent Abstracts of Japan, vol. 10, No. 36, Feb. 13, 1986, JP 60–186438.
Patent Abstracts of Japan, vol. 10, No. 148, May 29, 1986, JP 61–6147.
JP-A 155040/81 (with partial English language translation) was cited on p. 3, line 14, no date.

*Primary Examiner*—Karl Group
*Assistant Examiner*—C. M. Bonner
*Attorney, Agent, or Firm*—Beveridge, DeGrandi, Weilacher & Young

[57] ABSTRACT

Zinc-containing, lead- and cadmium-free glass frits with a softening point of less than 510° C. are disclosed. Obligatory components of the glass-frit composition are 31–50 mole % ZnO, 10–44 mole % SiO$_2$, 11–35 mole % B$_2$O$_3$ and 11–25 mole % Na$_2$O. The glass frits can be used as base frit for the production of decorative coating masses which can be stoved below 630° C., preferably masses for the decorating of glass.

14 Claims, No Drawings

ZINC-CONTAINING, LEAD- AND CADMIUM-FREE GLASS FRITS, METHOD OF THEIR PRODUCTION AND THEIR USE

BACKGROUND AND INTRODUCTION

The present invention relates to zinc-containing, lead- and cadmium-free glass frits, a method of their production and their use. The glass frits of the invention exhibit a softening point below 510° C. and are suitable for the production of decorative coating masses for glass, glass ceramics and other non-porous materials.

The customary method of producing decorative coating masses capable of being stoved, fired on, or baked, i.e., glazes, decorative colors and enamels for the decoration of glass and other ceramic and non-ceramic materials for which stoving temperatures below 750° C. are required, necessitates the use of low-melting glass frits whose composition usually exhibits a high lead content. On account of the toxicity of said lead-containing glass frits for possible users and workers in the production and processing of such products, and because of environmental concerns, there is currently a rapidly growing need for lead- and cadmium-free glass frits.

A number of lead- and cadmium-free glass frits have been suggested in the literature. It turned out, however, that such products do not always meet the requirements placed on them for certain applications and are deficient in one or more properties.

Thus, U.S. Pat. No. 4,446,241 teaches a lead-free glass frit composition consisting essentially of $Li_2O$, $B_2O_3$, $SiO_2$ and of 2–33% by weight $SnO_2+CaO$ and 2–33% by weight $ZrO_2+La_2O_3$; with typical additives $Al_2O_3$, SrO, BaO, $Na_2O$ and F exhibiting their expected functions. The glass softening temperature (fiber softening point) of these glass frits is in a range of 535° C. to 609° C. The softening temperature being above 535° C., as well as the $Li_2O$ content which exerts an unfavorable influence on the mechanical qualities, limits the possibilities of use since $Li^+$ migrates during the firing into the decorated glass, thus reducing the mechanical resistance of the decorated object. Non-toxic glass frits with a softening point below 535° C., but which also exhibit a high $Li_2O$ content (9 to 13% by weight), are also known from EP-B 0,294,502.

Glass frits known from U.S. Pat. No. 4,537,862 exhibit softening points in the same range as the previously mentioned glass frits. The composition is based essentially on $B_2O_3$, $SiO_2$, 10–18% by weight $ZrO_2$ and 10–18% by weight rare-earth metal oxide; the weight ratio of $ZrO_2$ to the rare-earth metal oxides is critical and is 1 to 1 to 1.4 to 1. Such glass frits are very expensive on account of their content of rare-earth oxides.

Glass frits in accordance with EP-A 0,347,379, with a glazing temperature around 600° C., contain 38–43% by weight $Bi_2O_3$ in addition to $SiO_2$, $B_2O_3$, alkali oxides and $ZrO_2+TiO_2$. The very high $Bi_2O_3$ content is considered by experts to be a disadvantage in regards to toxicological qualities.

A much-contested method of arriving at Pb- and Cd-free glass frits with low softening point consists in adding zinc oxide to glass frits:

For example, the glass-frit composition of U.S. Pat. No. 4,315,778 consists essentially of 30–45% $SiO_2$, 13–18% $B_2O_3$, 12–15% alkali oxides, 4–10% $ZrO_2$, 18–23% ZnO and 4–10% F (data in % by weight). The glass-frit composition of EP-A 0,321,297, which absorbs UV radiation, consists of 19–45% $SiO_2$, 20–33% $B_2O_3$, 8–15% alkali oxides, 2–25% of one or several oxides of the series Ce, Mn, Fe, Co, Cu, V and Mo and can additionally contain, among other things, 0–35% ZnO, preferably 8–21% ZnO (data in % by weight). Other zinc-containing, Pb- and Cd-free glass-frit compositions have been described in GB-B 1,013,597 (12–13% by weight ZnO), GB-B 768,925 (4–15% by weight ZnO), JP-A 155040/81 (1–15% by weight ZnO), JP-A 186438/85 (20–25% by weight ZnO) and EP-B 0,267,154.

Obligatory components of the glass frits of EP-B 0,267,154, which soften between 450° C. and 600° C., are 5–14 mole % $Na_2O$, 8–25 mole % ZnO, 6–13 mole % $B_2O_3$ and 45–60 mole % $SiO_2$; typical additive components are $K_2O$, $Li_2O$, CaO, SiO, BaO, $Bi_2O_3$, $Al_2O_3$, $ZrO_2$, $TiO_2$ and $WO_3$.

SUMMARY OF THE INVENTION

One object of the present invention is to provide glass frits and compositions containing them whose softening point is below 510° C. and which contain zinc but are free of lead and cadmium.

A further object of the invention resides in a method utilizing the glass frits as base frits for decorative coating masses such as glazes and enamels which can be stoved at temperatures which are as low as possible so that deformations of the object to be decorated, such as especially glass articles, can be reliably avoided.

Zinc-containing, lead- and cadmium-free glass frits with a softening point (glass transition temperature) of less than 510° C. were found which consist essentially of the following components:

31 to 50 mole % ZnO
10 to 44 mole % $SiO_2$
11 to 35 mole % $B_2O_3$
11 to 25 mole % $Na_2O$
0 to 4 mole % $Li_2O$
0 to 10 mole % $TiO_2$
0 to 25 mole % $ZrO_2$
0 to 12 mole % CaO
0 to 12 mole % SrO
0 to 12 mole % BaO
0 to 8 mole % F, and where the sum of CaO, SrO and BaO is equal to or less than 12 mole %.

Components of the glass frits which are essential for the present invention are therefore ZnO, $B_2O_3$, $SiO_2$ and $Na_2O$, and the ZnO content is greater than in previously known glass frits. This high portion of ZnO is responsible for the superb unexpected qualities of the glass frits.

Another object of the present invention is to provide a method of producing the glass frit disclosed above. The method involves melting a mixture of powdery raw glass materials at 1100° to 1300° C. and suddenly quenching the melt, wherein the mixture contains 31 to 50 mole % ZnO, 10 to 44 mole % $SiO_2$, 11 to 35 mole % $B_2O_3$, 11 to 25 mole % $Na_2O$, 0 to 4 mole % $Li_2O$, 0 to 10 mole % $TiO_2$, 0 to 25 mole % $ZrO_2$, 0 to 12 mole % CaO, 0 to 12 mole % SrO, 0 to 12 mole % BaO, 0 to 8 mole % F, wherein the sum of CaO, SrO and BaO is equal to or less than 12 mole %.

DETAILED DESCRIPTION OF THE INVENTION

The term "essentially" is intended to indicate that the glass frits can contain as a whole, in addition to the indicated components, less than 2 mole % (preferably less than 1 mole %) of other metal oxides, e.g. $Al_2O_3$, $SnO_2$, $CeO_2$, $La_2O_3$, MgO, $P_2O_5$; the content of coloring metal oxides such as e.g. $Fe_2O_3$, MnO, CaO, $Cr_2O_3$ is as a rule as low as possible, that is below 0.5 mole % as a whole.

Preferred glass frits are composed as follows:
33 to 45 mole % ZnO
10 to 40 mole % $SiO_2$
11 to 31 mole % $B_2O_3$
11 to 20 mole % $Na_2O$
0 to 4 mole % $K_2O$
0 to 4 mole % $Li_2O$
0 to 10 mole % $TiO_2$
0 to 10 mole % $ZrO_2$
0 to 10 mole % CaO
0 to 10 mole % SrO
0 to 10 mole % BaO
0 to 8 mole % F, and the sum of CaO, SrO and BaO is equal to or less than 10 mole %.

Especially preferred glass frits consist of 33–45 mole % ZnO, 11–35 mole % $SiO_2$, 11–31 mole % $B_2O_3$, 11–20 mole % $Na_2O$ and 0–4 mole % F.

The presence of the cited amounts of $B_2O_3$ and $Na_2O$ is required in conjunction with ZnO and $SiO_2$ in order to obtain glass frits with a softening point of below 510° C., preferably 450° to 485° C. In addition, it is possible to reduce the coefficient of thermal expansion by increasing the amount of boric oxide ($B_2O_3$); however, the $B_2O_3$ content must be limited in order to preserve the chemical resistance. A rising $Na_2O$ content permits a lowering of the softening point; however, it raises the coefficient of expansion, for which reason its content must also be limited. The resistance to acidic substances is increased by the presence of $TiO_2$ as a component of the frit composition. An addition of $ZrO_2$ increases the resistance of the frits to alkaline substances.

The presence of the alkaline-earth oxides BaO, SrO and CaO results in an increase of the softening point and at the same time in an improvement of the chemical resistance. The content of BaO and SrO is generally maintained as low as possible for toxicologic reasons.

The method of producing glass frits is known to those skilled in the art. A mixture of powdery raw glass materials, which are oxidic or form oxides during melting and are fluoridic as required, is melted at 1100° to 1300° C., especially 1150° to 1200° C.; the melt is subsequently suddenly quenched, e.g. by allowing the melt to flow into water and, to the extent required, ground to powder by customary methods. Suitable raw materials for the main components of the glass frits are quartz sand, zinc oxide, boric acid or borax, sodium carbonate. The optional additive components are advantageously used in oxidic form—$TiO_2$, $ZrO_2$, CaO, SrO, BaO—or as carbonates—$K_2CO_3$, $Li_2CO_3$. Fluorine is preferably introduced into the frit batch as NaF, $AlF_3$ or $Na_2SiF_6$. During the melting of the frit a part of the fluoride is generally removed in the form of gas and the remainder remains in the frit as fluoride. The raw materials are used in the production of the glass frit in an amount ratio which corresponds to that of the glass frit of the invention. Conventional equipment can be used for preparing the products of this invention.

The glass frits of the composition in accordance with the present invention are suitable as base frits for the production of decorative coating masses which are stoved below 750° C., especially below 630° C. and preferably between approximately 530° C. and below 600° C. The term decorative coating masses denotes glazes and enamels and decorative colors. In the case of glazes, they can contain transparent colored glass frits in addition to the base frit. Enamels contain inorganic pigments in addition to the base frit. Base frit and pigments are jointly ground in a known manner. The weight ratio of the base frit to the pigment or pigments of an enamel is usually in a range of 95 to 5 down to 80 to 20. In order to produce so-called decorative colors, the mixture of glass frit and pigment is subjected to a sintering process with subsequent grinding.

The low stoving or baking temperature of the decorative coating masses containing glass frits of the present invention makes these masses suitable for the decorating of glass, glass ceramics and other non-porous ceramic and non-ceramic, e.g. metallic materials. The use of such coating masses for the decoration of glass is to be especially emphasized since a deformation of the object to be decorated can be prevented. For decoration, the glass frit is ground with a mineral pigment additive to an average fineness of usually 5–10 μm. The ground frit-pigment mixture is dispersed in a customary organic printing medium and the paste obtained is applied with customary methods (e.g. silk screen printing, spray application, stamp printing) onto the object to be decorated; the decoration is then stoved or baked. The decorative coating masses obtainable by using the glass frits of the present invention are especially suitable for the decoration of small perfume or cosmetic bottles, drinking glasses and bottles.

The glass frits of the invention contain, as presented, a higher ZnO content than previously known Pd- and Cd-free glass frits do. It could not have been foreseen that glass frits with a ZnO content distinctly higher than that of previously known frits both melt below 510° C. and exhibit excellent properties for various applications, including a good chemical resistance.

EXAMPLES

The following examples show in tables 1 to 3 the composition of glass frits in accordance with the present invention as well as their coefficient of thermal expansion α between 0° and 300° C. and their softening point (glass transition temperature Tg, determined by measuring thermal expansion). The production of the glass frits takes place, as described above, making use of quartz sand, soda, boric oxide, zinc oxide and additionally $ZrO_2$, NaF and $Na_2SiF_6$, CaO, SrO, BaO at a melting temperature of 1150° to 1200° C. The frits according to table 2 have proven to be especially suitable for the decoration of glass.

TABLE 1

| | Example Number | | | | |
|---|---|---|---|---|---|
| | 1 | 2 | 3 | 4 | 5 |
| $Na_2O$ (mol-%) | 13.9 | 16.9 | 19.8 | 17.4 | 19.3 |
| ZnO (mol-%) | 39.7 | 37.7 | 44.7 | 39.8 | 34.2 |
| $B_2O_3$ (mol-%) | 16.5 | 15.1 | 11.7 | 30.9 | 11.3 |
| $SiO_2$ (mol-%) | 29.9 | 30.3 | 23.8 | 11.9 | 35.2 |
| $a_o^{300}$ ($°10^{-7} \cdot K^{-1}$) | 79.0 | 94.3 | 85.3 | 87.0 | 101 |
| Tg (°C.) | 502 | 467 | 465 | 465 | 486 |

TABLE 2

| | Example Number | | | | |
|---|---|---|---|---|---|
| | 6 | 7 | 8 | 9 | 10 |
| $Na_2O$ (mol-%) | 16.4 | 15.9 | 17.9 | 15.9 | 15.7 |
| ZnO (mol-%) | 35.8 | 34.7 | 38.5 | 40.5 | 37.6 |

TABLE 2-continued

| | Example Number | | | | |
|---|---|---|---|---|---|
| | 6 | 7 | 8 | 9 | 10 |
| $B_2O_3$ (mol-%) | 19.4 | 24.0 | 26.0 | 28.2 | 28.0 |
| $SiO_2$ (mol-%) | 24.8 | 21.9 | 13.9 | 11.7 | 15.0 |
| F (mol-%) | 3.6 | 3.5 | 3.7 | 3.7 | 3.7 |
| $\alpha_o^{300}$ (°$10^{-7} \cdot K^{-1}$) | 87.8 | 86.3 | 93.7 | 83.7 | 81.6 |
| Tg (°C.) | 475 | 485 | 450 | 465 | 475 |

TABLE 3

| | Example Number | | |
|---|---|---|---|
| | 11 | 12 | 13 |
| $Na_2O$ (mol-%) | 16.5 | 11.1 | 15.3 |
| ZnO (mol-%) | 33.5 | 35.5 | 37.7 |
| $B_2O_3$ (mol-%) | 14.7 | 17.8 | 20.0 |
| $SiO_2$ (mol-%) | 22.6 | 22.8 | 17.0 |
| F (mol-%) | 7.2 | 7.2 | |
| $ZrO_2$ (mol-%) | 5.5 | 5.6 | |
| CaO (mol-%) | | | 5.2 |
| SrO (mol-%) | | | 2.9 |
| BaO (mol-%) | | | 1.9 |
| $\alpha_o^{300}$ (°$10^{-7} \cdot K^{-1}$) | 89.6 | 72.7 | 87.4 |
| Tg (°C.) | 475 | 505 | 510 |

The present invention also relates to an article (e.g., glass, ceramic) having a surface decorated with a composition containing the glass frit described herein and optionally an inorganic pigment. The article is produced by methods known in the art.

Further variations and modifications of the invention will become apparent to those skilled in the art from the foregoing and are intended to be encompassed by the claims appended hereto.

French Priority Application 92 02457, filed on Mar. 2, 1992, is relied on and incorporated by reference.

What is claimed:

1. A zinc-containing, lead- and cadmium-free glass frit comprising 31 to 50 mole % ZnO, 10 to 44 mole % $SiO_2$, 11 to 35 mole % $B_2O_3$, 11 to 25 mole % $Na_2O$, 0 to 4 mole % $Li_2O$, 0 to 10 mole % $TiO_2$, 0 to 25 mole % $ZrO_2$, 0 to 12 mole % CaO, 0 to 12 mole % SrO, 0 to 12 mole % BaO, 0 to 8 mole % F, wherein the sum of CaO, SrO and BaO is equal to or less than 12 mole %, wherein said glass frit has a softening point of less than 510° C.; wherein said glass frit contains less than 1 mole % of other metal oxides.

2. The glass frits according to claim 1, comprising 33 to 45 mole % ZnO, 10 to 40 mole % $SiO_2$, 11 to 31 mole % $B_2O_3$, 11 to 20 mole % $Na_2O$, 0 to 4 mole % $K_2O$, 0 to 4 mole % $Li_2O$, 0 to 10 mole % $TiO_2$, 0 to 10 mole % $ZrO_2$, 0 to 10 mole % CaO, 0 to 10 mole % SrO, 0 to 10 mole % BaO, 0 to 8 mole % F, wherein the sum of CaO, SrO and BaO is equal to or less than 10 mole %.

3. The glass frit according to claim 1, comprising 33 to 45 mole % ZnO, 11 to 35 mole % $SiO_2$, 11 to 31 mole % $B_2O_3$, 11 to 20 mole % $Na_2O$, and 0 to 4 mole % F.

4. The glass frit according to claim 1, wherein said other metal oxides are selected from the group consisting of $Al_2O_3$, $SnO_2$, $CeO_2$, $La_2O_3$, MgO, $P_2O_5$, and mixtures thereof.

5. The glass frit according to claim 1, wherein the content of coloring metal oxides is below 0.5 mole %.

6. The glass frit according to claim 5, wherein said coloring metal oxides are selected from the group consisting of $Fe_2O_3$, MnO, CaO, $Cr_2O_3$ and mixtures thereof.

7. The glass frit according to claim 1, wherein said glass frit has a softening point of from 450° to 485° C.

8. An article having a surface decorated with a composition comprising the glass frit of claim 1.

9. The article according to claim 8, wherein said article is a glass article.

10. The article according to claim 8, wherein said article is a ceramic article.

11. An article having a surface decorated with a composition comprising the glass frit according to claim 1 and an inorganic pigment.

12. The glass frit according to claim 1, consisting essentially of 31 to 50 mole % ZnO, 10 to 44 mole % $SiO_2$, 11 to 35 mole % $B_2O_3$, 11 to 25 mole % $Na_2O$, 0 to 4 mole % $Li_2O$, 0 to 10 mole % $TiO_2$, 0 to 25 mole % $ZrO_2$, 0 to 12 mole % CaO, 0 to 12 mole % SrO, 0 to 12 mole % BaO, 0 to 8 mole % F, wherein the sum of CaO, SrO and BaO is equal to or less than 12 mole %, wherein said glass frit contains less than 1 mole % of other optional metal oxides, and wherein said glass frit has a softening point of less than 510° C.

13. The article according to claim 8, wherein said glass frit consists essentially of 31 to 50 mole % ZnO, 10 to 44 mole % $SiO_2$, 11 to 35 mole % $B_2O_3$, 11 to 25 mole % $Na_2O$, 0 to 4 mole % $Li_2O$, 0 to 10 mole % $TiO_2$, 0 to 25 mole % $ZrO_2$, 0 to 12 mole % CaO, 0 to 12 mole % SrO, 0 to 12 mole % BaO, 0 to 8 mole % F, wherein the sum of CaO, SrO and BaO is equal to or less than 12 mole %, wherein said glass frit contains less than 1 mole % of other optional metal oxides, and wherein said glass frit has a softening point of less than 510° C.

14. The article according to claim 1, wherein said glass frit consists essentially of 31 to 50 mole % ZnO, 10 to 44 mole % $SiO_2$, 11 to 35 mole % $B_2O_3$, 11 to 25 mole % $Na_2O$, 0 to 4 mole % $Li_2O$, 0 to 10 mole % $TiO_2$, 0 to 25 mole % $ZrO_2$, 0 to 12 mole % CaO, 0 to 12 mole % SrO, 0 to 12 mole % BaO, 0 to 8 mole % F, wherein the sum of CaO, SrO and BaO is equal to or less than 12 mole %, wherein said glass frit contains less than 1 mole % of other optional metal oxides, and wherein said glass frit has a softening point of less than 510° C.

* * * * *